United States Patent
Mori

(10) Patent No.: US 8,199,775 B2
(45) Date of Patent: *Jun. 12, 2012

(54) OPTICAL TRANSMISSION DEVICE AND OPTICAL TRANSMISSION METHOD

(75) Inventor: Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1006 days.

This patent is subject to a terminal disclaimer.

(21) Appl. No.: 12/078,654

(22) Filed: Apr. 2, 2008

(65) Prior Publication Data
US 2008/0253770 A1    Oct. 16, 2008

(30) Foreign Application Priority Data
Apr. 12, 2007   (JP) ................. 2007-105240

(51) Int. Cl.
*H04J 3/24* (2006.01)

(52) U.S. Cl. ............ 370/474; 370/230.1; 370/235; 370/391; 370/392; 370/395.1; 370/466; 370/468; 370/471; 370/475; 370/534; 370/538; 398/154; 398/156; 709/231; 709/233; 709/236; 375/268; 375/300; 375/320; 375/353

(58) Field of Classification Search .......... 370/230–235, 370/389, 391–393, 395.1, 395.51, 468, 534, 370/538, 470–476; 398/154, 155, 156; 709/231–234, 236; 375/268–270, 300, 301, 375/320, 321, 353

See application file for complete search history.

(56) References Cited

U.S. PATENT DOCUMENTS

| 5,787,255 | A | * | 7/1998 | Parlan et al. | 709/233 |
| 6,167,041 | A | * | 12/2000 | Afanador | 370/353 |
| 7,191,249 | B1 | * | 3/2007 | Lacroute et al. | 709/240 |
| 7,899,329 | B2 | * | 3/2011 | Yamabana | 398/66 |
| 2006/0120365 | A1 | * | 6/2006 | Nishihara | 370/389 |
| 2006/0133809 | A1 | * | 6/2006 | Chow et al. | 398/66 |
| 2007/0058974 | A1 | * | 3/2007 | Krimmel | 398/63 |

(Continued)

FOREIGN PATENT DOCUMENTS
JP    2000-188593    7/2000
(Continued)

OTHER PUBLICATIONS
ITU, ITU-T Rec. G.984.3, Oct. 27, 2005, ITU-T.*
(Continued)

*Primary Examiner* — Hoon J Chung
(74) *Attorney, Agent, or Firm* — Staas & Halsey LLP

(57) ABSTRACT

An output control unit outputs data of bit rate A to a first header-attaching unit and data of bit rate B to a second header-attaching unit. An instructing unit instructs the first or the second header-attaching unit to attach a header of bit rate being the least bit rate to the data of bit rate A or B. The first header-attaching unit creates a header of bit rate A, including an ID of a destination ONU of the data of bit rate A and information concerning the data length, and attaches the header of bit rate A to the data of bit rate A. The second header-attaching unit creates a header of bit rate A, including an ID of the destination ONU of the data of bit rate B and information concerning the data length, and attaches the header of bit rate A to the data of bit rate B.

5 Claims, 16 Drawing Sheets

U.S. PATENT DOCUMENTS

| | | | | |
|---|---|---|---|---|
| 2007/0230471 A1* | 10/2007 | Ikeda et al. | | 370/392 |
| 2008/0187317 A1* | 8/2008 | Yamabana | | 398/98 |
| 2009/0010650 A1* | 1/2009 | Tsuchiya et al. | | 398/59 |
| 2009/0034964 A1* | 2/2009 | Sakai et al. | | 398/17 |
| 2009/0202242 A1* | 8/2009 | Niibe et al. | | 398/63 |
| 2009/0208207 A1* | 8/2009 | Suvakovic | | 398/45 |
| 2009/0210553 A1* | 8/2009 | Takase et al. | | 709/232 |

FOREIGN PATENT DOCUMENTS

| | | |
|---|---|---|
| JP | 2005-33537 | 2/2005 |
| JP | 2007-19797 | 1/2007 |
| JP | 2007-019797 A * | 1/2007 |
| WO | WO2005/096574 A1 * | 10/2005 |

OTHER PUBLICATIONS

"Gigabit-capable Passive Optical Networks (G-PON): Transmission convergence layer specification", ITU-T Recommendation G.984.3; Feb. 2004.

"Part 3: Carrier sense multiple access with collision detection (CSMA/CD) access method and physical layer specifications", IEEE Std 802.3TM-2005; Dec. 9, 2005.

Japanese Office Action issued Sep. 6, 2011 in corresponding Japanese Patent Application 2007-105240 (2 pages) (4 pages English Translation).

* cited by examiner

OPTICAL TRANSMISSION DEVICE AND OPTICAL TRANSMISSION METHOD

BACKGROUND OF THE INVENTION

1. Field of the Invention

The present invention relates to an optical transmission device and an optical transmission method, and more particularly to an optical transmission device and an optical transmission method that can unequivocally establish synchronization at the receiver end in addition to preventing degradation of reception quality and enabling transmission of signals of different bit rates.

2. Description of the Related Art

In recent years, attention is being focused on optical transmission systems using optical fibers as a communication system having the potential for large volumes of data at high speed. In an optical transmission system, an optical line terminal (OLT) serving as a host station device and a plurality of optical network units (ONUs) functioning as subscriber devices are connected by optical fibers.

In the optical transmission system, here is ongoing formulation of standardization of data frame structure when data is transmitted downstream (from the OLT to the ONUs). For example, "Gigabit-capable Passive Optical Networks (G-PON)-Transmission convergence layer specification", Recommendation G. 984.3 of International Telecommunication Union-Telecommunication (ITU-T), formulated in February, 2004, stipulates that the Physical Control Block downstream (PCBd), which is equivalent to a frame header, be followed by a data area that includes an Asynchronous Transfer Mode (ATM) cell or a G-PON Encapsulation Mode (GEM) area. Similarly, "Part 3: Carrier sense multiple access with collision detection (CSMA/CD) access method and physical layer specifications" Institute of Electrical and Electronic Engineers (IEEE) Standard 802.3 TM-2005, formulated in December, 2005, stipulates that the Multi-Point Control Protocol (PMCP) frame includes a header having a preamble and a destination address, and the data area be of variable length.

The data contained in such frames are transmitted to the ONUs corresponding to the addresses. In other words, in a frame according to Recommendation G. 984.3 of ITU-T, a frame containing data to be transmitted to a plurality of ONUs includes the addresses of the ONUs in the frame header attached to the ATM cell or the GEM area. Specifically, identifiers that point to the destination ONUs to which data is transmitted are stored as Virtual Path Identifiers (VPI) in the frame header of the ATM cell or as Port IDs in the frame headers of the GEM area. Thus, the ONUs can identify the data to be addressed to itself in accordance with the identifiers in the frame header.

As regards MPCP frame according to Standard 802.3 of IEEE, each MPCP frame contains only one ONU address, which is the destination address of the data contained in the MPCP frame. Specifically, the ONU is identified by a Logical Link Identifier (LLID) stored in the preamble of the frame header. Then, the ONU determines the MPCP frame having the destination address of the data applicable to itself and receives the MPCP frame.

However, the bit rate of the frames has not been taken into consideration while formulating these standardizations. In other words, the standardizations have been made on the assumption that data is transmitted and received by all the ONUs at the same bit rate. Therefore, problems will be encountered if there are signals of diverse bit rates to be transmitted from one OLT to a plurality of ONUs.

As a solution to the problem, a technology is disclosed in Japanese Patent Application Laid-open No. 2000-188593 whereby the OLT stores in the frame header of each frame speed data and phase data concerning each sub-frame contained in the frame, and each ONU receives the sub-frames having the speed data and phase data applicable to itself. Thus, even if there are signals with different bit rates meant for a plurality of ONUs, each ONU receives the correct signal meant for it.

As described above, it is assumed that normally transmission of signals from the OLT to a plurality of ONUs takes place at the same bit rate. However, if the bit rates of the signals meant for some of the ONU addresses are increased, malsynchronization results in the concerned ONUs. Specifically, each ONU extracts a clock component from the received signal and performs a Clock Data Recovery (CDR) process to establish synchronization. If the bit rate of the received signal is stepped up from the bit rate at which the ONU is capable of properly receiving the signal, the ONU will not be able establish a normal synchronization and retrieve the identifier included in the header. Not being able to retrieve the identifier results in the ONU not being able to receive the data meant for it.

Further, the signal with a bit rate other than that can be received by the ONU is perceived as noise. Therefore, if positions of such signals are not identified accurately, there could be degradation in the reception quality.

Further, in the technology disclosed in Japanese Patent Application Laid-open No. 2000-188593, whereby the ONUs can be identified by the speed data and phase data, every ONU is required to have a different bit rate in order to be clearly identified in accordance with the speed data and phase data. In other words, all the ONUs connected to the OLT in such an optical transmission system will be required to have different bit rates, resulting in a tradeoff in flexibility in system designing.

SUMMARY OF THE INVENTION

It is an object of the present invention to at least partially solve the problems in the conventional technology.

According to an aspect of the present invention, an optical transmission device that transmits data to a plurality of destination addresses, includes a first header-attaching unit that attaches a header of a first bit rate to data of the first bit rate, the header of the first bit rate including identification data for identifying a destination address of the data of the first bit rate, a second header-attaching unit that attaches the header of the first bit rate to data of a second bit rate greater than the first bit rate, the header of the first bit rate including identification data for identifying a destination address of the data of the second bit rate, and a transmitting unit that transmits the data having the header of the first bit rate attached thereto by the first header-attaching unit and the second header-attaching unit.

According to another aspect of the present invention, an optical transmission device that receives a signal including therein data of a plurality of different bit rates, includes a clock-signal extracting unit that extracts a clock signal from the received signal, a frequency dividing unit that divides the clock signal extracted by the clock-signal extracting unit to obtain a slow clock signal corresponding to the least bit rate from among the plurality of bit rates, a header extracting unit that extracts a header of the least bit rate from the received signal using the slow clock signal obtained by the frequency dividing unit, and a data retrieving unit that retrieves the data that is addressed to the optical transmission device in accordance with the header extracted by the header extracting unit.

According to still another aspect of the present invention, an optical transmission method for transmitting data to a plurality of destination addresses includes attaching a header of a first bit rate to data of the first bit rate, the header of the first bit rate including identification data for identifying a destination address of the data of the first bit rate, attaching the header of the first bit rate to data of a second bit rate greater than the first bit rate, the header of the first bit rate including identification data for identifying a destination address of the data of the second bit rate, and transmitting the data having the header of the first bit rate attached thereto.

According to still another aspect of the present invention, an optical transmission method for receiving a signal including therein data of a plurality of different bit rates at a receiving end, includes extracting a clock signal from the received signal, dividing the extracted clock signal to obtain a slow clock signal corresponding to the least bit rate from among the plurality of bit rates, extracting a header of the least bit rate from the received signal using the obtained slow clock signal, and retrieving the data that is addressed to the receiving end in accordance with the extracted header.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The gist of the present invention is that when there are pieces of data to be transmitted at different bit rates, the different bit rates of the headers are made common, and set to the least bit rate among the bit rates. Then, each set of data and its header having the common bit rate is sent as a transmission unit. Exemplary embodiments of the present invention are described below with reference to the accompanying drawings.

Figure 1:
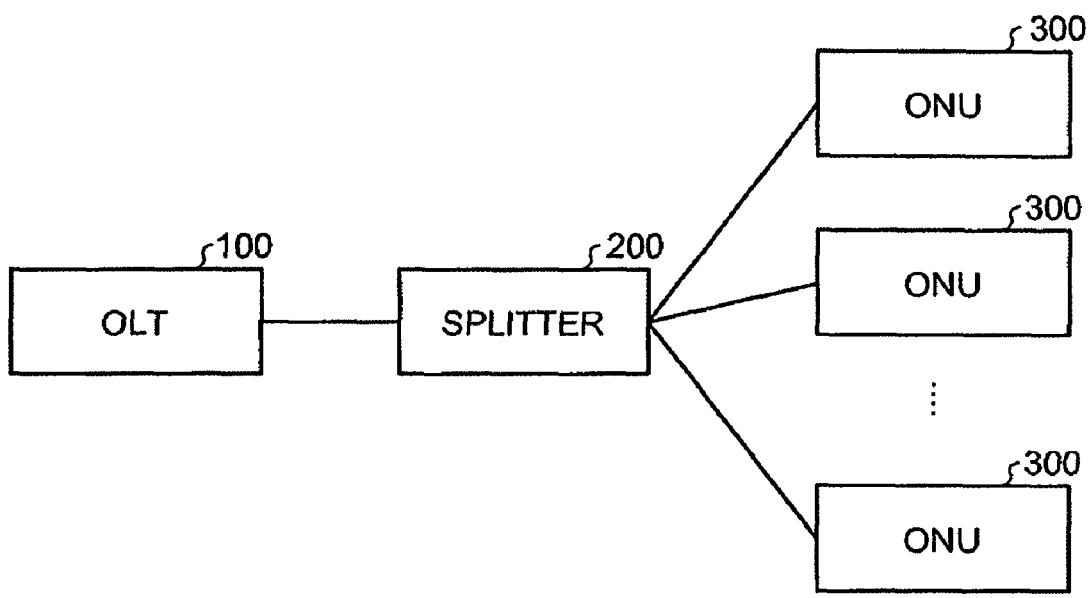
FIG. 1 is a schematic diagram of an optical transmission system according to a first embodiment of the present invention.

FIG. 1 is a schematic diagram of an optical transmission system according to a first embodiment of the present invention. In the optical transmission system according to the first embodiment, an optical line terminal (OLT) 100 serving as a host station device is connected via a splitter 200 to a plurality of optical network units (ONUs) 300 functioning as subscriber devices.

The OLT 100 transmits signals over optical fibers to the ONUs 300 by time division multiplexing. The OLT 100 attaches a header of the same bit rate to all pieces of data and transmits each set of data and its header as one transmission unit. The header attached to the data contains the least bit rate from among all the bit rates of the data to be transmitted. The header also contains information concerning the ID of the destination ONU 300 and a position of the data among the transmission units.

The splitter 200 splits the optical fiber from the OLT 100 to connect the OLT 100 to each of the ONUs 300. Thus, signals transmitted over the optical fiber from the OLT 100 are transmitted to all the ONUs 300 via the splitter 200.

Each of the ONUs 300 receives the signal over the optical fiber and retrieves the data in the transmission unit that includes its ID in the header. Each of the ONUs 300 shown in FIG. 1 has a different bit rate at which it receives the signal. However, some of the ONUs 300 can have the same bit rate. In the first embodiment, for the sake of convenience, it is assumed that the ONUs 300 are a mix of ones that receive data at bit rate A and those that receive data at bit rate B, where bit rate B is greater/faster than bit rate A.

Figure 2:
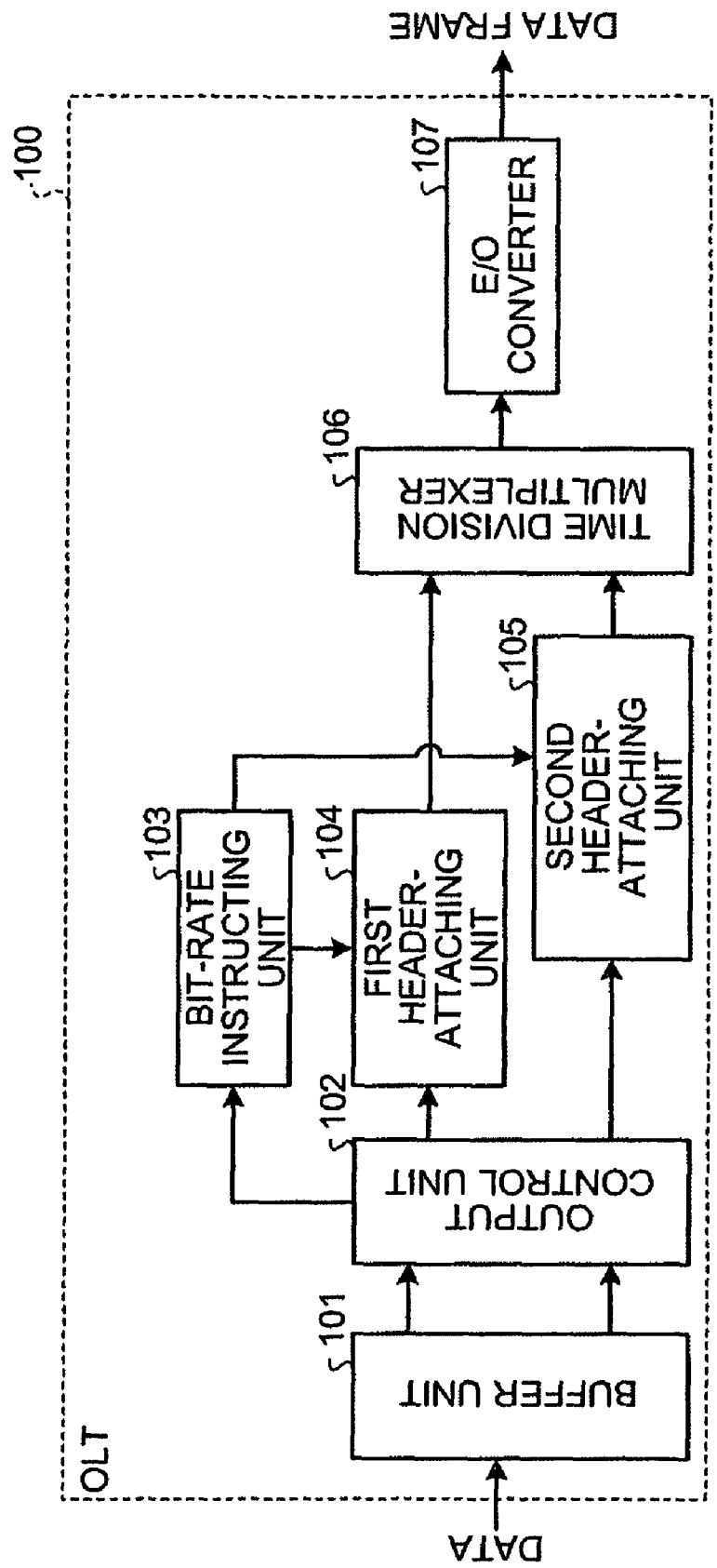
FIG. 2 is a block diagram of an OLT according to the first embodiment.

FIG. 2 is a block diagram of a relevant part of the OLT 100 according to the first embodiment. The OLT 100 includes a buffer unit 101, an output control unit 102, a bit-rate instructing unit 103, a first header-attaching unit 104, a second header-attaching unit 105, a time division multiplexer 106, and an electrical-to-optical (E/O) converter 107.

The buffer unit 101 temporarily holds the data to be transmitted to the ONUs 300. The buffer unit 101 holds data to be transmitted to the ONUs 300 receiving data at bit rate A as well as bit rate B. In other words, the buffer unit 101 stores data of both bit rates A and B.

The output control unit 102 outputs the data contained in one transmission unit from the buffer unit 101 to the first header-attaching unit 104 or the second header-attaching unit 105. Specifically, the output control unit 102 outputs the data of bit rate A to the first header-attaching unit 104 and the data of bit rate B to the second header-attaching unit 105. The output control unit 102 also outputs a notification to the bit-rate instructing unit 103 indicating that the data contained in one transmission unit has been output to the first header-attaching unit 104 or the second header-attaching unit 105.

If the transmission unit is a fixed length cell of Asynchronous Transfer Mode (ATM), the data contained in one transmission unit corresponds to a payload of fixed length, excluding the header of the ATM cell. If the transmission unit is a variable length area of Gigabit-capable Passive Optical Networks (G-PON) Encapsulation Mode (GEM) or a variable length frame of Multi-Point Control Protocol (MPCP), the data contained in one transmission unit is equivalent to an Ethernet (registered trademark) packet input in the buffer unit 101. Thus, one transmission unit contains data meant solely for one ONU 300.

Upon being notified by the output control unit 102 that the data has been output to the first header-attaching unit 104 or the second header-attaching unit 105, the bit-rate instructing unit 103 instructs the first header-attaching unit 104 or the second header-attaching unit 105 the bit rate of the header to be attached to the data. In other words, the bit-rate instructing unit 103 instructs the first header-attaching unit 104 and the second header-attaching unit 105 to attach a header of bit rate A, which is the smaller bit rate of the two.

In response to the instruction from the bit-rate instructing unit 103, the first header-attaching unit 104 creates a transmission unit by attaching a header of bit rate A to the data of bit rate A. Specifically, the first header-attaching unit 104 creates a header of bit rate A containing the ID of the destination ONU 300 of the data and information concerning a length of the data (hereinafter, "data length"), and attaches the header to the data of bit rate A received from the output control unit 102.

Similarly, in response to the instruction from the bit-rate instructing unit 103, the second header-attaching unit 105 creates a transmission unit by attaching a header of bit rate A to the data of bit rate B. Specifically, the second header-attaching unit 105 creates a header of bit rate A containing the ID of the destination ONU 300 of the data and the data length, and attaches the header to the data of bit rate B received from the output control unit 102. In other words, the second header-attaching unit 105 creates a transmission unit in which the bit rate of the data to be transmitted is different from the bit rate of the header.

Thus, both the first header-attaching unit 104 and the second header-attaching unit 105 attach a header of bit rate A, which is the smaller/slower of bit rates A and B, to the data. In the first embodiment, only two bit rates have been given as examples. However, even if the ONUs 300 are a mix of three or more bit rates, irrespective of the bit rate of the data, all the headers will be of a common bit rate, which would be the least bit rate among the bit rates.

The time division multiplexer 106 creates a data frame by subjecting one transmission unit or a plurality of transmission units to time division multiplexing. In other words, the time division multiplexer 106 arranges one transmission unit or a plurality of transmission units on a timeline, and outputs the transmission unit(s) as a single integrated data frame. When creating a data frame from a plurality of transmission units, the time division multiplexer 106 can attach a frame header for the entire data frame.

The E/O converter 107 converts the data frame created by the time division multiplexer 106 to an optical signal, and outputs the optical signal to the optical fiber.

Figure 3:
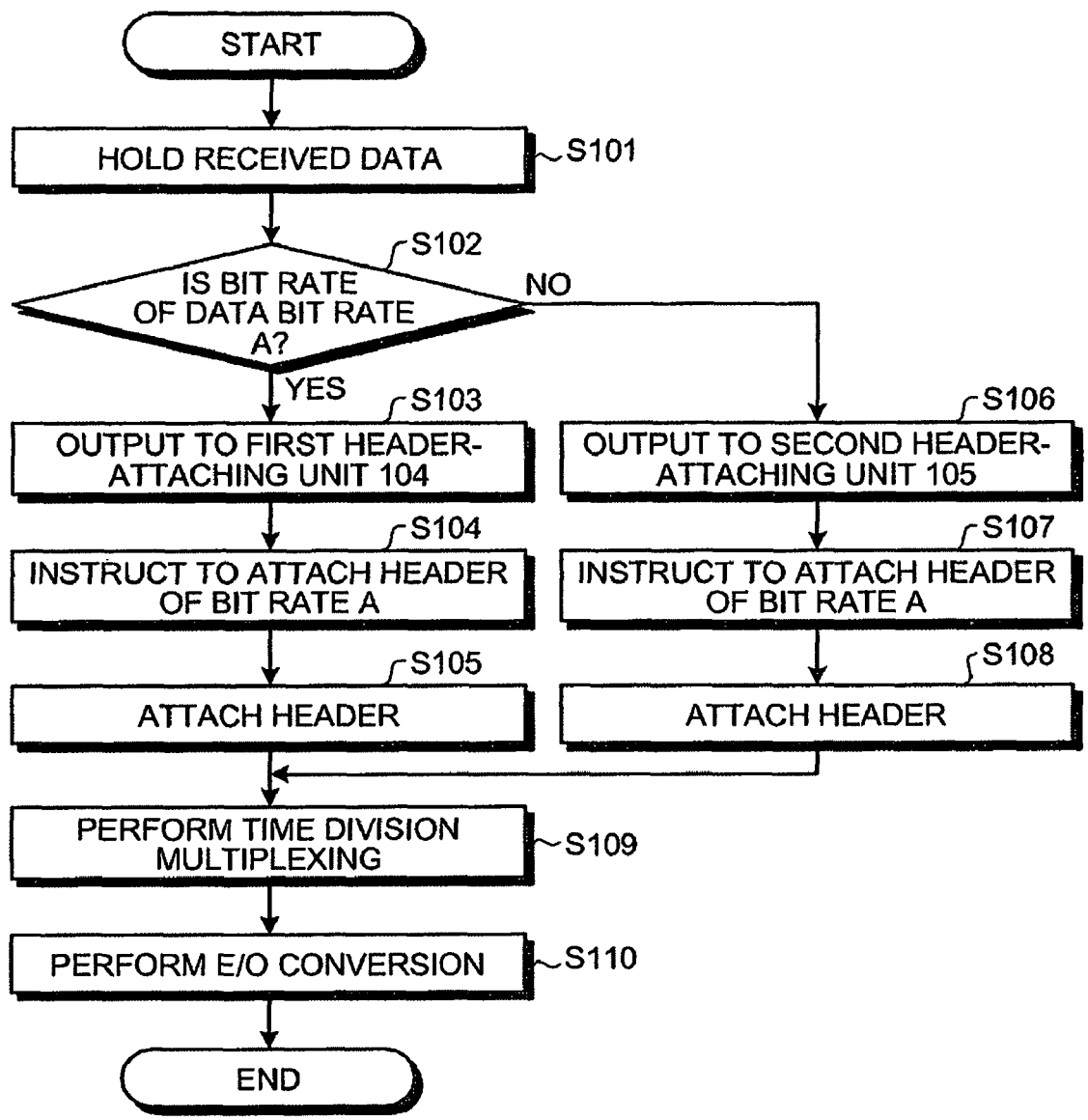
FIG. 3 is a flowchart of processes performed by the OLT according to the first embodiment.

FIG. 3 is a flowchart of the processes performed by the OLT 100 according to the first embodiment.

When the OLT 100 receives input of the data to be transmitted to the ONUs 300, and the buffer unit 101 temporarily holds the received data (step S101). The bit rates of the data received correspond to the bit rates at which the ONUs 300 can receive the data. In this example, these bit rates are bit rates A and B. The output control unit 102 determines whether the bit rate of the data is bit rate A (step S102), and if so (Yes at step S102), the output control unit 102 outputs the data of one transmission unit from the buffer unit 101 to the first header-attaching unit 104 (step S103).

At the same time, the output control unit 102 outputs a notification to the bit-rate instructing unit 103 indicating that the data of one transmission unit has been output to the first header-attaching unit 104, and in response, the bit-rate instructing unit 103 instructs the first header-attaching unit 104 to attach a header of bit rate A to the data (step S104).

In response to the instruction from the bit-rate instructing unit 103, the first header-attaching unit 104 creates a header of bit rate A that contains therein information concerning the ID of the destination ONU 300 and the data length and attaches the header to the data received from the output control unit 102 (step S105). Thus, a transmission unit is created in which the header of bit rate A is attached to the data of bit rate A.

If, according to the outcome of determination performed by the output control unit 102, the bit rate of the data is bit rate B (No at step S102), the output control unit 102 outputs the data of one transmission unit from the buffer unit 101 to the second header-attaching unit 105 (step S106).

At the same time, the output control unit 102 outputs a notification to the bit-rate instructing unit 103 indicating that the data of one transmission unit has been output to the second header-attaching unit 105, and in response, the bit-rate instructing unit 103 instructs the second header-attaching unit 105 to attach a header of bit rate A to the data (step S107).

In response to the instruction from the bit-rate instructing unit 103, the second header-attaching unit 105 creates a header of bit rate A that contains therein information concerning the ID of the destination ONU 300 and the data length and attaches the header to the data received from the output control unit 102 (step S108). Thus, a transmission unit is created in which a header of bit rate A is attached to the data of bit rate B.

As the bit rates of the data are different in the transmission units created by the first header-attaching unit 104 and the second header-attaching unit 105, the data volumes transmitted are different even though the size of the two transmission units are the same. In other words, as the transmission unit created by the second header-attaching unit 105 includes the data of bit rate B, more data is transmitted via transmission unit as compared to the transmission unit created by the first header-attaching unit 104, even though the size of the two transmission units might be the same.

On the other hand, as the bit rate of the headers is the same in the transmission units created by the first header-attaching unit 104 and the second header-attaching unit 105, even the ONUs 300 capable of receiving data only at the lower bit rate A can properly receive the all the headers of the transmission units, and therefore can determine from the IDs of the ONUs 300 stored in the headers whether the data in the transmission units is meant for it.

The time division multiplexer 106 subjects the single transmission unit or plural transmission units created by the first header-attaching unit 104 or the second header-attaching unit 105 to time division multiplexing and creates a data frame (step S109). The E/O converter 107 converts the data frame into an optical signal (step S110), and transmits the optical signal to the ONUs 300 over the optical fibers.

Figure 4:
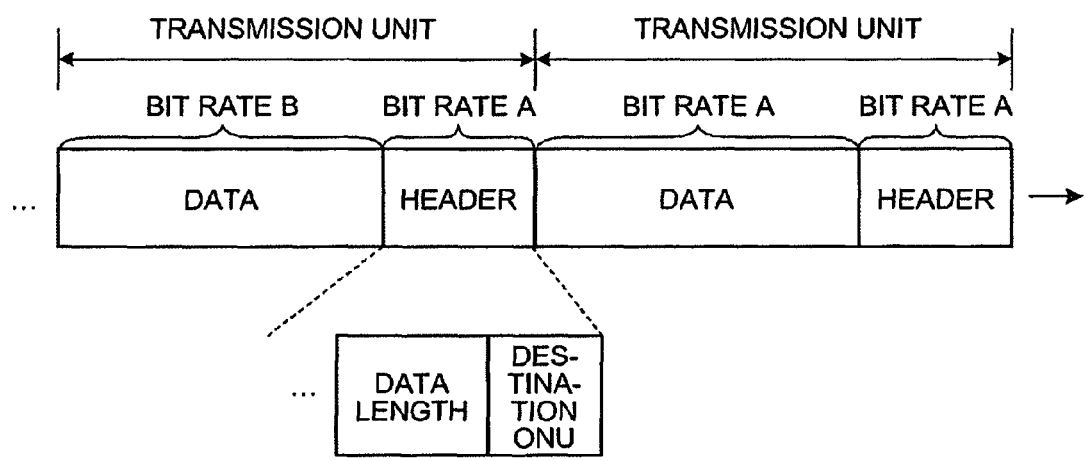
FIG. 4 is a schematic representation of a configuration of data frame according to the first embodiment.

The data frame transmitted from the E/O converter 107 includes one transmission unit or a plurality of transmission units, each transmission unit consisting of a set of data and its header. FIG. 4 is a schematic representation of a configuration of a data frame according to the first embodiment. The data portion of each transmission unit, as shown in FIG. 4, is a signal of either bit rate A or bit rate B according to the destination ONU 300. However, the header portion of every transmission unit is solely of bit rate A, irrespective of the bit rate of the destination ONU 300. The header portion contains therein information concerning the ID of the destination ONU 300 and the data length. The data length stored in the header portion can be in the form of actual data length or can be represented as a set of a data start position and a data end position.

Figure 5:
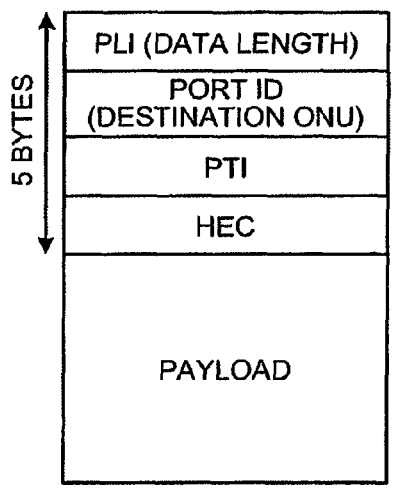
FIG. 5 is a schematic representation of a specific example of a transmission unit according to the first embodiment.

Specifically, if the transmission unit is a GEM area according to Recommendation G. 984.3 of ITU-T, the header portion of the transmission unit will include four fields, i.e. Payload Length Indicator (PLI), Port ID, Payload Type Indicator (PTI), and Header Error Control (HEC), as shown in FIG. 5. The field PLI contains the data length, and the field Port ID contains the identification data of the destination ONU 300. The signal corresponding to the header portion is always of bit rate A, irrespective of the bit rate of the data in the field Payload.

Figure 6:
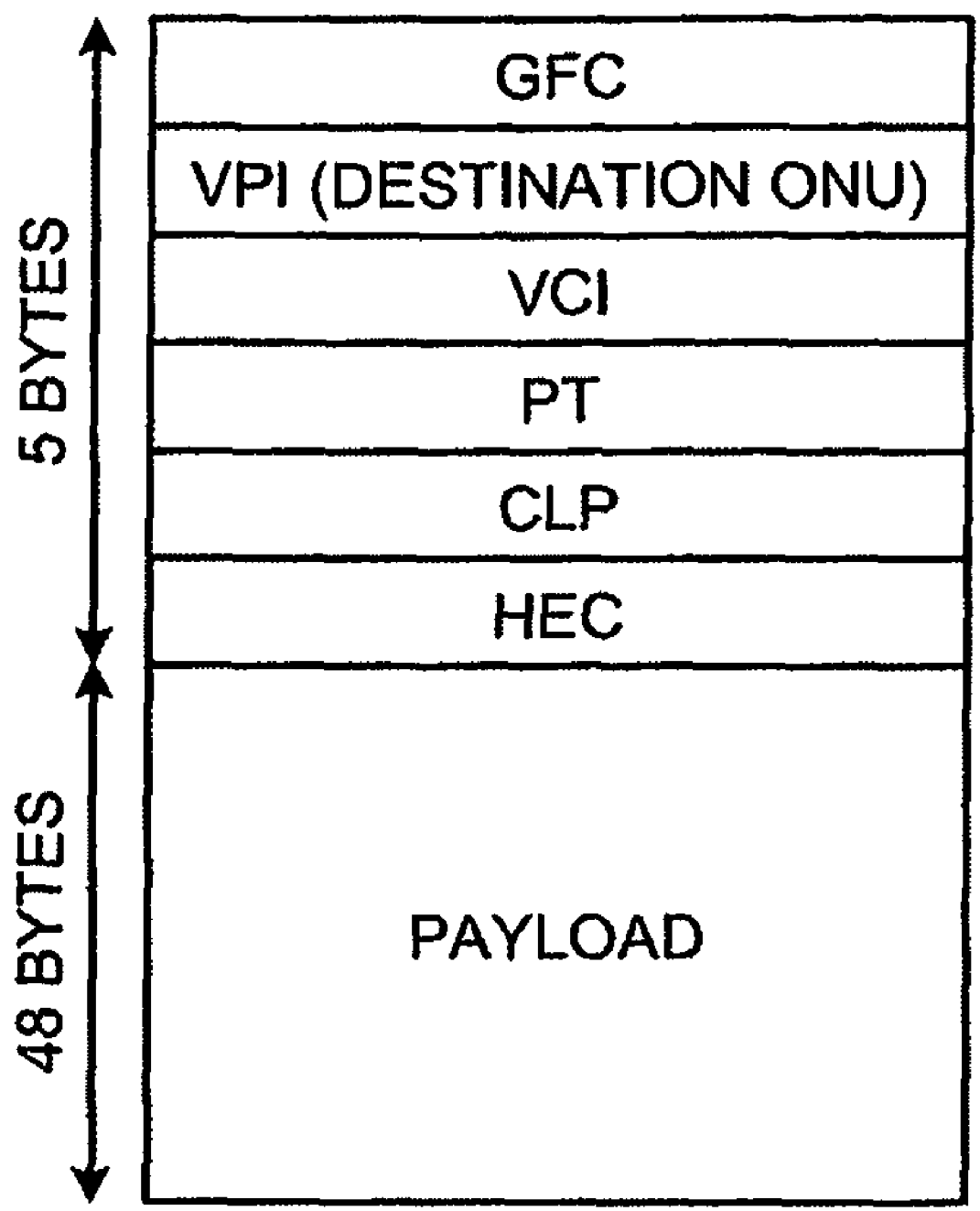
FIG. 6 is a schematic representation of another specific example of the transmission unit according to the first embodiment.

If the transmission unit is an ATM cell according to Recommendation G. 984.4 of ITU-T, the header portion of the transmission unit will include six fields, i.e. General Flow Control (GFC), Virtual Path Identifier (VPI), Virtual Channel Identifier (VCI), Payload Type (PT), Cell Loss Priority (CLP), and Header Error Control (HEC), as shown in FIG. 6. The field VPI contains the identification data of the destination ONU 300. As the ATM cell is of fixed length, fixing the data length in the field Payload to 48 bytes, as shown in FIG. 6, obviates the need for storing the information concerning the data length in the header portion.

If the transmission unit is a MPCP frame according to IEEE 802.3, which is not shown in the drawings, the identification data is stored in the field LLID, and the data length is also stored in the field Type/Length.

Thus, whether the transmission unit is a GEM area, an ATM cell, or an MPCP frame, it is composed of a set of data and its header, the bit rate of the header being the least bit rate of the bit rates at which the ONUs 300 are capable of receiving data. Thus, synchronization can be established among all the ONUs 300 by referring to the headers of all the transmission units, enabling the ONUs 300 to access the ID of the destination ONU 300 and the data length stored in the headers. In other words, synchronization is established unequivocally on the receiving side, preventing degradation of reception quality and enabling transmission of signals of different bit rates at the same time.

Figure 7:
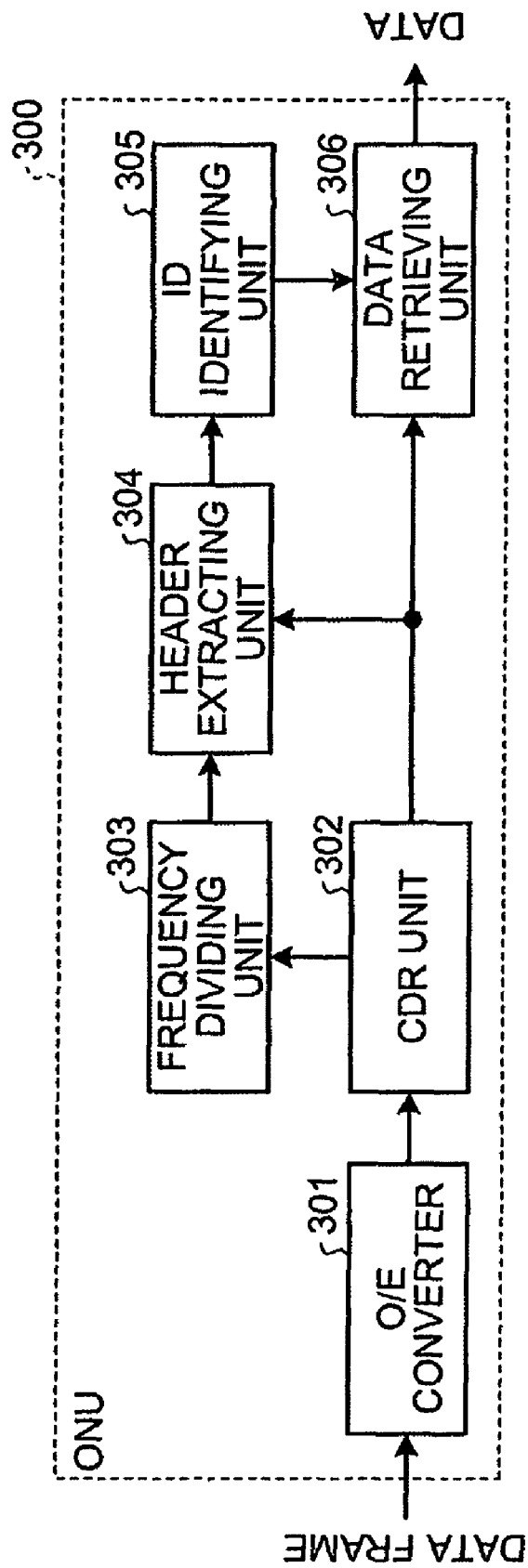
FIG. 7 is a block diagram of an ONU according to the first embodiment.

A configuration of the ONU 300 is described below with reference to FIG. 7. FIG. 7 is a block diagram of a relevant part of the ONU 300 capable of receiving data at bit rate B according to the first embodiment. The configuration of the ONU 300 capable of receiving data at bit rate A is identical to that of a conventional ONU and hence is not described here. The ONU 300 shown in FIG. 7 includes an optical-to-electrical (O/E) converter 301, a clock-data recovery (CDR) unit 302, a frequency dividing unit 303, a header extracting unit 304, an ID identifying unit 305, and a data retrieving unit 306.

The O/E converter 301 receives the data frame from the optical fiber split by the splitter 200, converts the received signal into an electrical signal, and outputs the electrical signal to the CDR unit 302.

The CDR unit 302 extracts the clock signal from the data frame and outputs the extracted clock signal to the frequency dividing unit 303. In addition, the CDR unit 302 outputs the single transmission unit or plural transmission units in the data frame to the header extracting unit 304 and the data retrieving unit 306. As the ONU 300 described here is capable of receiving data at bit rate B, the CDR unit 302 extracts the clock signal of bit rate B from the data frame.

The frequency dividing unit 303 divides the clock signal extracted by the CDR unit 302 into clock signals of different (lower) frequencies, and outputs the clock signal of bit rate A to the header extracting unit 304. In other words, the CDR unit 302 creates from the clock signal of bit rate B the clock signal of bit rate A for extraction of the header, and outputs the clock signal of bit rate A to the header extracting unit 304.

The header extracting unit 304 establishes synchronization with the transmission unit in the data frame using the clock signal of bit rate A received from the frequency dividing unit 303, and extracts the header from the transmission unit.

The ID identifying unit 305 checks if the ID of the destination ONU 300 in the header of the transmission unit matches its ID, and if so, instructs the data retrieving unit 306 to retrieve the data in the transmission unit.

The data retrieving unit 306 retrieves the data from the transmission unit indicated by the ID identifying unit 305. The data retrieved by the data retrieving unit 306 is data meant for its own ONU 300 according to the address of the ONU 300 in the header attached to the data. In this case, while the bit rate of the header is bit rate A, the bit rate of the data signal retrieved by the data retrieving unit 306 is bit rate B.

In the first embodiment, as each of the transmission units created by the OLT 100 has a header of bit rate A, every ONU 300 capable of receiving data at bit rate B needs to divide the clock signal of bit rate B and generate the clock signal of bit rate A. Using the clock signal of bit rate A, the ONU 300 establishes synchronization with the header of the transmission unit, and identifies from the ID in the header whether the data in the transmission unit is meant for it. Thus, the ONU 300 capable of receiving data at bit rate B can retrieve data meant for it even from the transmission unit with a header of bit rate A.

Meanwhile, the ONU 300 capable of receiving data at bit rate A as usual establishes synchronization with the header of the transmission unit using the clock signal of bit rate A, and identifies from the ID in the header whether the data in the transmission unit is meant for it. Further, the ONU 300 capable of receiving data at bit rate A ignores the transmission units containing data of bit rate B. Consequently, there is no possibility of any malfunctioning in the form of degradation of reception quality caused by data of bit rate B.

Thus, according to the first embodiment, the OLT creates transmission units by attaching to each transmission unit a header of the least bit rate among the bit rates at which the plurality of ONUs are capable of receiving data, and creates a data frame by subjecting one or a plurality of transmission units to time division multiplexing. The header of the transmission unit contains the ID for identifying the destination ONU of the data. Thus, all the ONUs, irrespective of the bit rate at which they are capable of receiving data, are able to establish synchronization with the header of every transmission unit, and identify the address in the transmission unit. Consequently, apart from establishing synchronization on the receiving side, degradation of reception quality can be prevented and signals of different bit rates can be transmitted at the same time.

In a second embodiment of the present invention, synchronization preserving patterns meant for the ONU capable of receiving data at bit rate A are inserted in the data meant for the ONU capable of receiving data at bit rate B to unequivocally prevent loss of synchronization in the ONU capable of receiving data at bit rate A.

Figure 8:
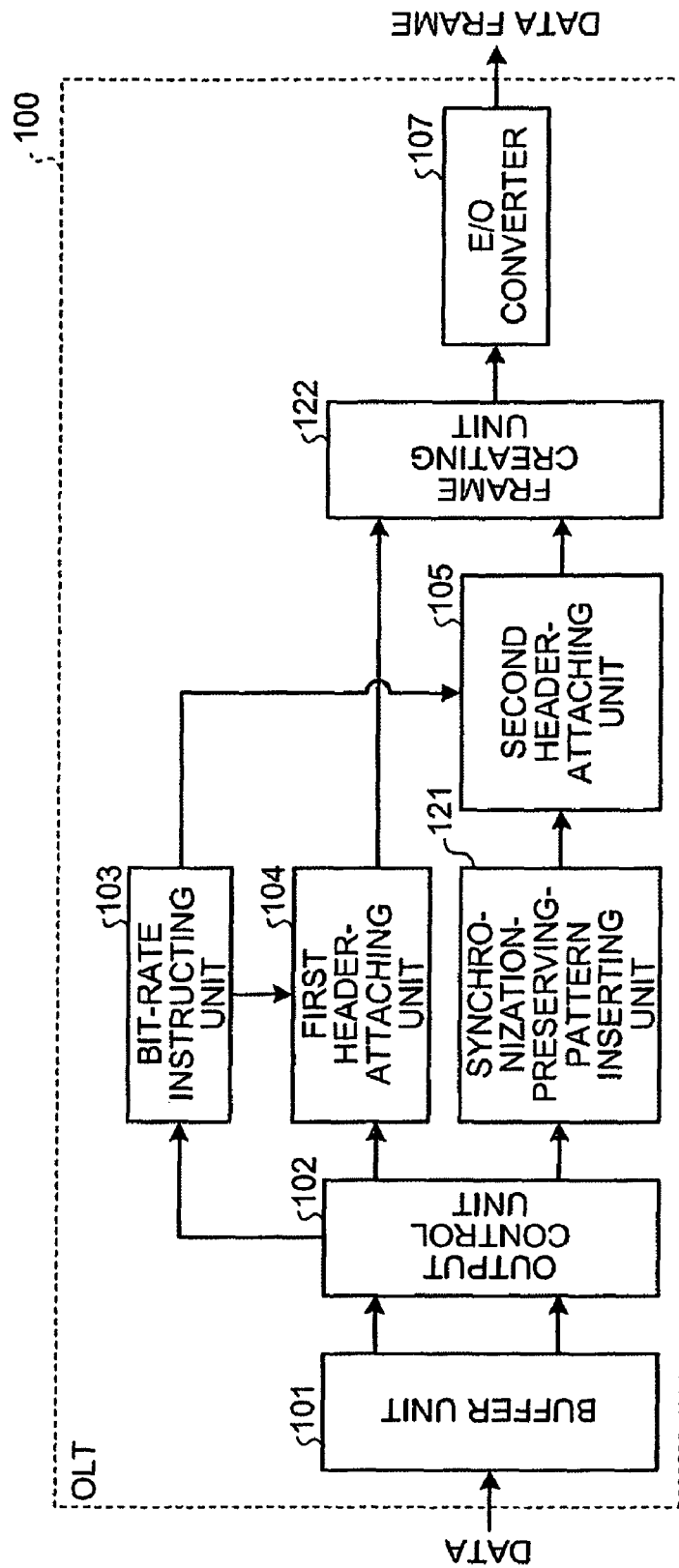
FIG. 8 is a block diagram of an OLT according to a second embodiment of the present invention.

FIG. 8 is a block diagram of a relevant part of the OLT 100 according to the second embodiment. The parts or components in FIG. 8 that are identical to those in FIG. 2 have been assigned the same reference numerals and have not been described again. The OLT 100 shown in FIG. 8 differs from that shown in FIG. 2 in that it additionally includes a synchronization-preserving-pattern inserting unit 121, and a frame creating unit 122 replaces the time division multiplexer 106.

The synchronization-preserving-pattern inserting unit 121 inserts, at predetermined periodicity, synchronization preserving patterns of bit rate A to the data of bit rate B output from the output control unit 102. The synchronization preserving pattern is a signal of a bit pattern the ONU 300 is already familiar with. Hence by detecting the synchronization preserving patterns of bit rate A inserted in the data of bit rate B, the ONU 300 capable of receiving data of bit rate A is able to sustain an already established synchronization.

The frame creating unit 122 subjects a plurality of transmission units to time division multiplexing and creates a data frame by attaching a frame header of bit rate A. Specifically, the frame creating unit 122 arranges a plurality of transmission units including the data of bit rates A and B and the headers of bit rate A attached to the data on a timeline, and outputs the transmission units with a frame header for the entire data transmission units.

Figure 9:
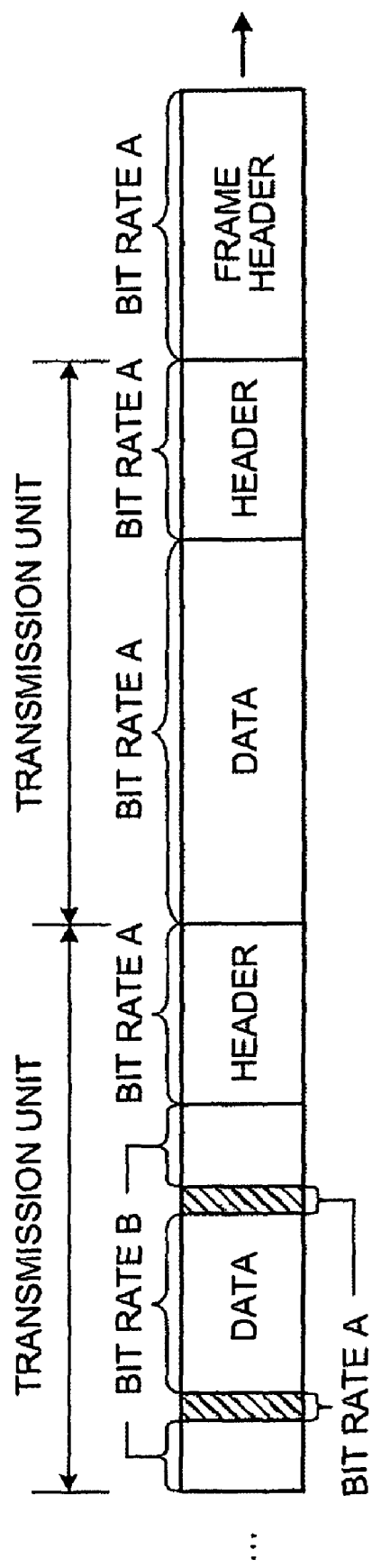
FIG. 9 is a schematic representation of a configuration of a data frame according to the second embodiment.

As in the first embodiment, in the second embodiment, too, a transmission unit is composed of a set of data and its header, and as shown in FIG. 9, a data frame is composed of a plurality of transmission units and a frame header. The frame header contains position information of the known signal used for establishing frame synchronization and of every transmission unit in the data frame. In other words, from the information stored in the frame header, the ONU 300 can determine the position of the transmission unit that includes the data of bit rate A or of the transmission unit that includes the data of bit rate B. The frame header is a signal of bit rate A, and all the ONUs 300 can recognize the content of the frame header.

As in the first embodiment, in the second embodiment, too, the headers of all the transmission units are signals of bit rate A, and all the ONUs can determine whether the data of the transmission unit is meant for it by checking if the address in the header of the transmission unit is its own.

Further, as shown in FIG. 9, the synchronization preserving patterns of bit rate A are inserted at predetermined periodicity in the data portion of bit rate B. All the ONUs 300 are already familiar with the bit pattern and the periodicity of the synchronization preserving patterns.

Normally, the ONU 300 capable of receiving data at bit rate A determines from the header of bit rate A whether the transmission unit is carrying data meant for itself and ignores all the transmission units that are carrying data not meant for itself, and is able to prevent malsynchronization using the clock signals in the signal, even if a transmission unit is not carrying data meant for itself. However, the ONU 300 capable of receiving data at bit rate A is unable to sustain synchronization using the clock signal of the data portion of bit rate B. Therefore, in the second embodiment, to enable the ONU 300 capable of receiving data at bit rate A to sustain synchronization using the clock signal of the data portion of bit rate B, the synchronization preserving patterns of bit rate A are inserted data portion of bit rate B.

Thus, the ONU 300 capable of receiving data at bit rate A can use the data portion of bit rate B can still maintain synchronization and does not lose an already established synchronization.

Figure 10:
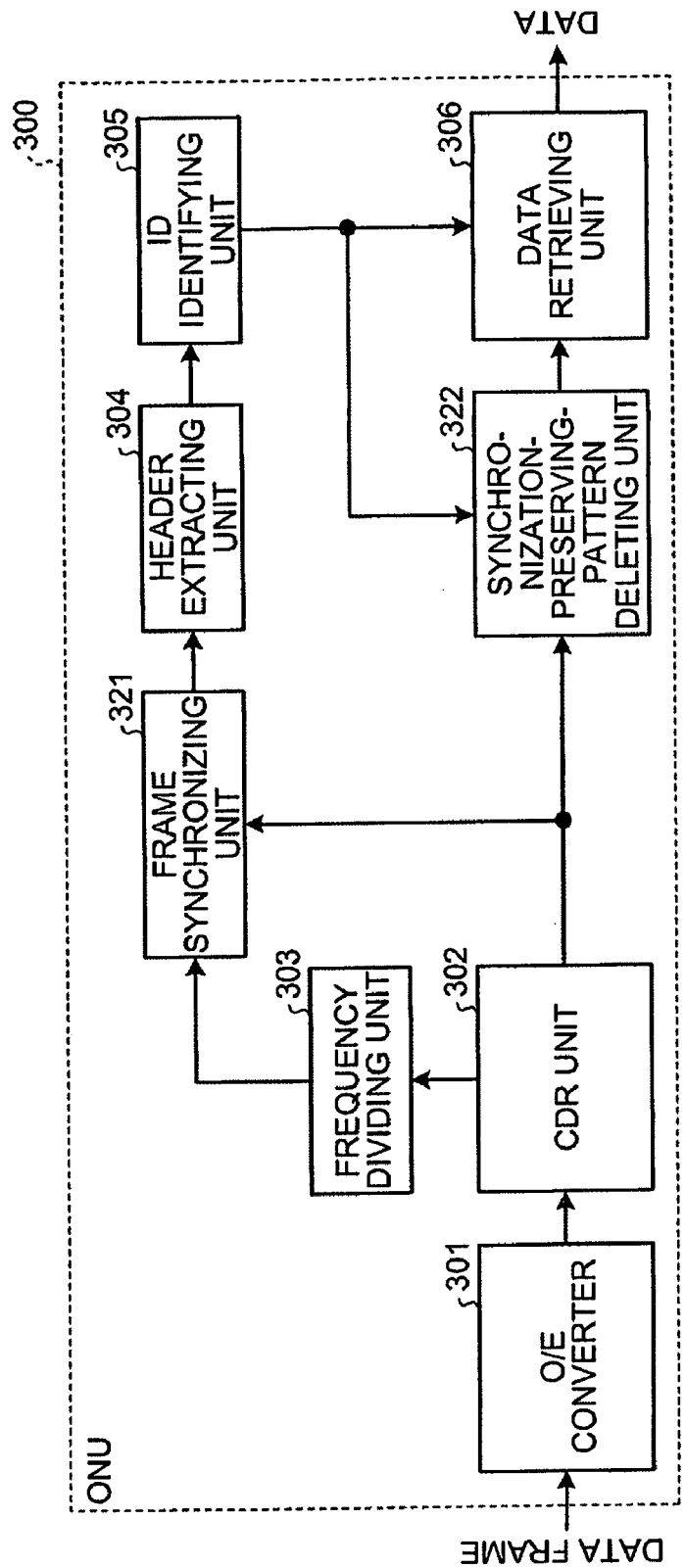
FIG. 10 is a block diagram of an ONU according to the second embodiment.

FIG. 10 is a block diagram of the ONU 300 according to the second embodiment. The parts or components in FIG. 10 that are identical to those in FIG. 7 have been assigned the same reference numerals and have not been described again. The ONU 300 shown in FIG. 10 differs from that shown in FIG. 7 in that it additionally includes a frame synchronizing unit 321 and a synchronization-preserving-pattern deleting unit 322. The ONU 300 shown in FIG. 10 is capable of receiving data at bit rate B.

The frame synchronizing unit 321 detects the beginning of a frame using the frame synchronization signal stored in the frame header of the data frame and establishes synchronization. As the frame header is a signal of bit rate A, the frame synchronizing unit 321 uses the clock signal of bit rate A obtained by the frequency dividing performed by the frequency dividing unit 303. After frame synchronization is established, the frame synchronizing unit 321 outputs the headers of the all the transmission units in the data frame to the header extracting unit 304.

The synchronization-preserving-pattern deleting unit 322 deletes the synchronization preserving patterns inserted at predetermined periodicity in the data portion of the transmission unit meant for its own ONU 300. Then the synchronization-preserving-pattern deleting unit 322 outputs to the data retrieving unit 306 only the data in the data portion of the transmission unit meant for its own ONU 300.

According to the second embodiment, even though the synchronization preserving patterns of bit rate A is inserted in the data portion of bit rate B, the data portion of bit rate B is not impacted by their presence as they are deleted by the ONU 300 capable of receiving data at bit rate B. Further, the ONU 300 capable of receiving data at bit rate A can sustain synchronization using the data portion of bit rate B not meant for itself.

Thus, according to the second embodiment, the OLT inserts the synchronization preserving patterns of bit rate A at predetermined periodicity in the data of bit rate B, and the ONU capable of receiving data of bit rate A can sustain established synchronization using the synchronization preserving patterns in the data portion of bit rate B not meant for itself.

In a third embodiment of the present invention, a transmission unit is created by attaching a common header of least bit rate to a data portion that includes data meant for a plurality of ONUs of high bit rate.

Figure 11:
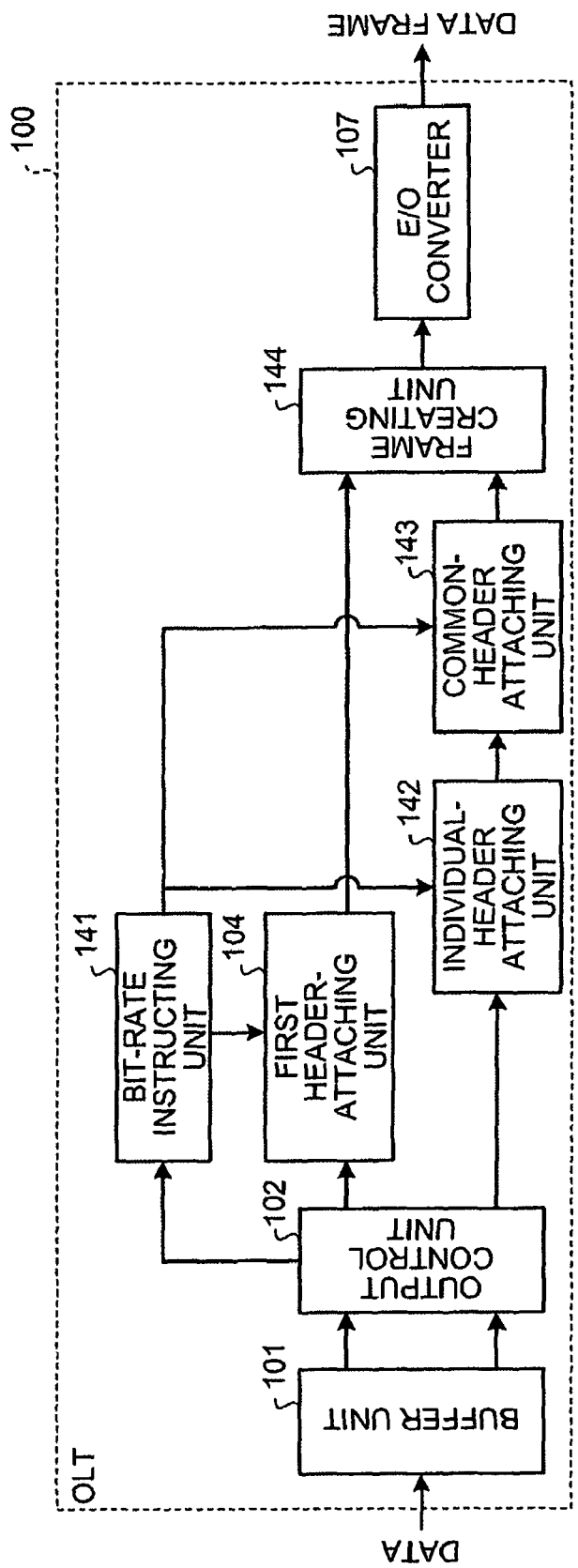
FIG. 11 is a block diagram of an OLT according to a third embodiment of the present invention.

FIG. 11 is a block diagram of a relevant part of the OLT 100 according to the third embodiment. The parts or components in FIG. 11 that are identical to those in FIG. 2 have been assigned the same reference numerals and have not been described again. The OLT 100 shown in FIG. 11 includes the buffer unit 101, the output control unit 102, a bit-rate instructing unit 141, the first header-attaching unit 104, an individual-header attaching unit 142, a common-header attaching unit 143, a frame creating unit 144, and the E/O converter 107.

The bit-rate instructing unit 141 instructs the bit rate of the header to be attached to data input to the first header-attaching unit 104, the individual-header attaching unit 142, and the common-header attaching unit 143. In other words, the bit-rate instructing unit 141 instructs the first header-attaching unit 104 to attach to the data a header of bit rate A. Further, the bit-rate instructing unit 141 instructs the individual-header attaching unit 142 to attach to the data an individual header of bit rate B to the data while instructing the common-header attaching unit 143 to attach a common header of bit rate A.

In response to the instruction from the bit-rate instructing unit 141, the individual-header attaching unit 142 attaches an individual header of bit rate B to the data of bit rate B. The individual header contains therein the individual ID of the ONU 300 for which the data of bit rate B is meant.

In response to the instruction from the bit-rate instructing unit 141, the common-header attaching unit 143 creates a transmission unit by attaching a common header to a single or pieces of data of bit rate B to which individual header is attached. The common header contains a common ID indicating that the data portions attached to the common header are signals of bit rate B. The transmission unit created by the common-header attaching unit 143 includes data meant for a plurality of ONUs 300.

The frame creating unit 144 subjects the transmission units to which headers have been attached by the first header-attaching unit 104 and the transmission units to which a common header is attached by the common-header attaching unit 143 to time division multiplexing, and further attaches a frame header of bit rate A to the time division multiplexed transmission units to create a data frame.

Figure 12:
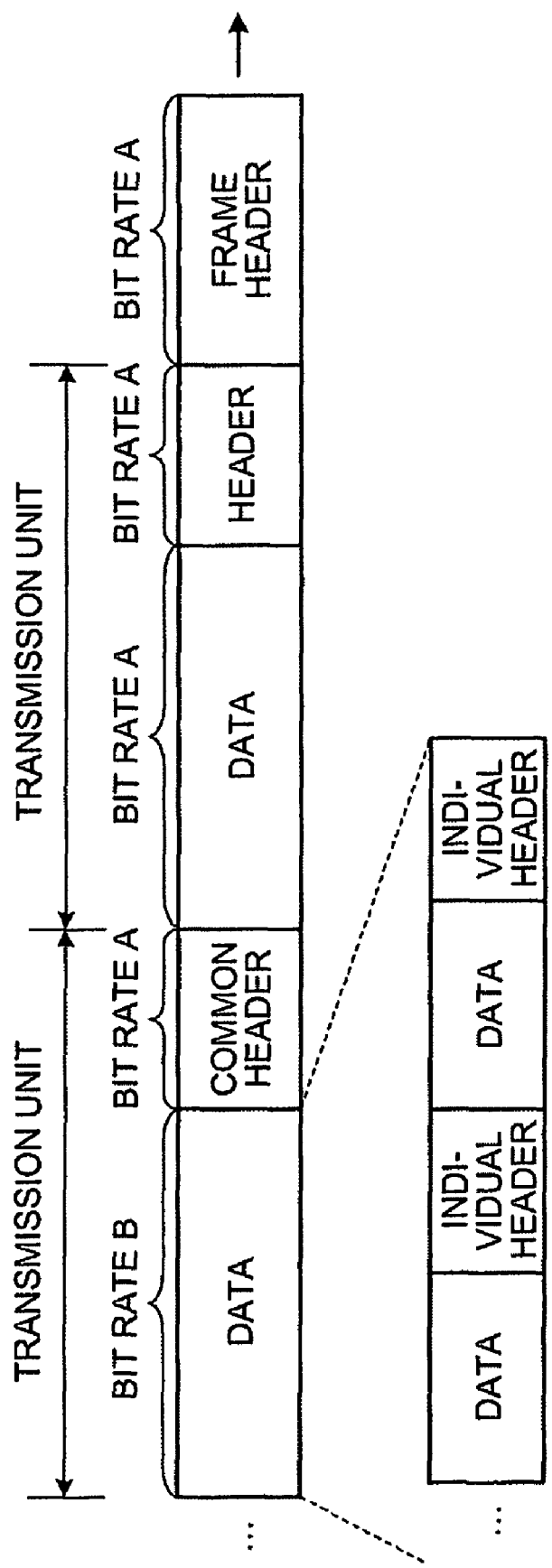
FIG. 12 is a schematic representation of a configuration of a data frame according to the third embodiment.

In the third embodiment, as shown in FIG. 12, the data portion of bit rate B includes a plurality of sets of an individual header and data wherein each piece of data is meant for a different ONU 300. The destination address of each piece of data is identified by an individual ID of the ONU 300 stored in its individual header. A common header of bit rate A is attached to the plurality of sets of individual header and data. The common header of bit rate A contains therein the common ID indicating that the data portions attached to the common header are signals of bit rate B. The ONU 300 receiving the data frame can identify the position of the data portion of bit rate B from the common header of bit rate A.

Thus, if the ONU 300 capable of receiving data at bit rate A receives the data frame, it ignores the data portions attached to the common header that indicates that data portions of bit rate B are attached to it. If the ONU 300 capable of receiving data at bit rate B receives the data frame, it recognizes the data meant for itself from the ID stored in the individual headers of the data portions attached to the common header that indicates that data portions of bit rate B are attached to it.

Figure 13:
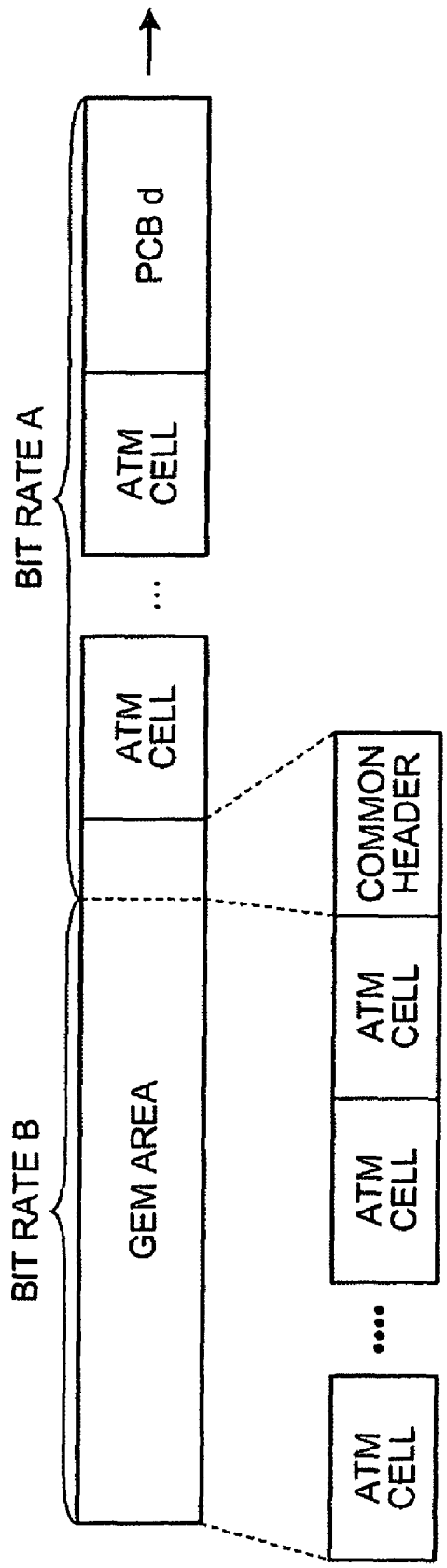
FIG. 13 is a schematic representation of a specific example of the data frame according to the third embodiment.
Figure 14:
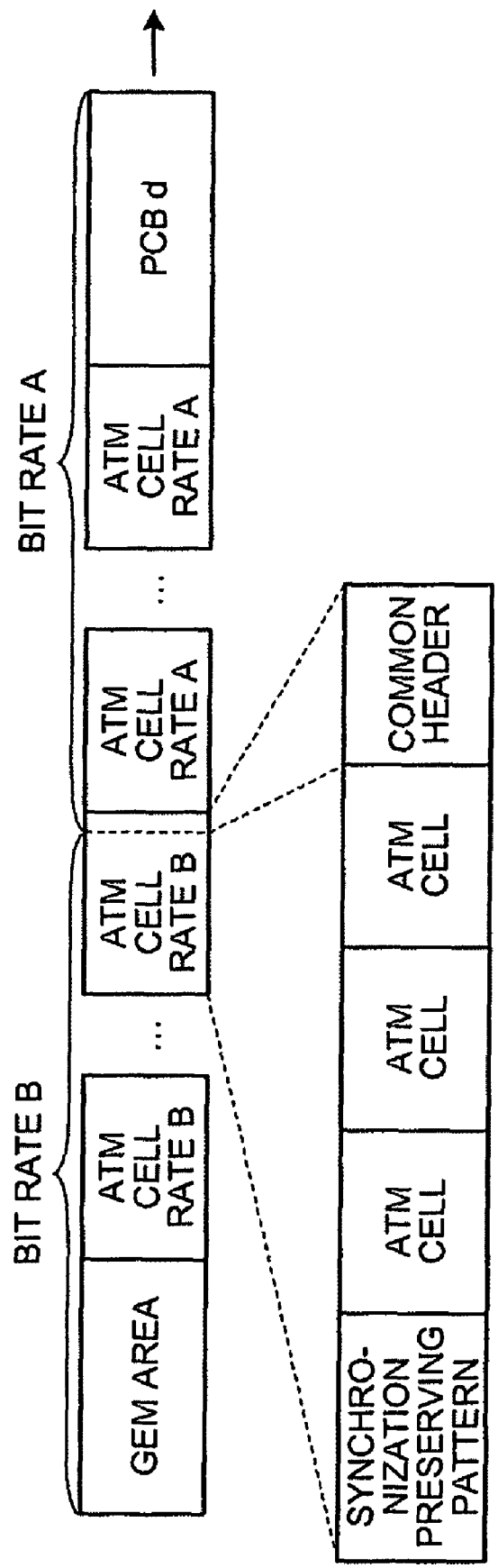
FIG. 14 is a schematic representation of another specific example of the data frame according to the third embodiment.

FIG. 13 is a schematic representation of a configuration of a data frame according to Recommendation G. 984.3 of ITU-T wherein a plurality of ATM cells with destination addresses of ONUs 300 capable of receiving data at bit rate B is contained in a GEM area. FIG. 14 is a schematic representation of another configuration of a data frame wherein a plurality of ATM cells with destination address of ONUs 300 capable of receiving data at bit rate B is contained in one ATM cell.

In the data frame shown in FIG. 13, a plurality of ATM cells of bit rate A is attached to the PCBd, which is equivalent to a frame header. A GEM area follows the ATM cells of bit rate A, the GEM area containing a plurality of ATM cells of bit rate B. Each ATM cell of bit rate B has its own individual header containing therein the individual ID indicating the address of the destination ONU 300. The plurality of ATM cells of bit rate B containing different addresses has a common header attached to it. The common header of the ATM cells of bit rate B contains therein data indicating that the ATM cells attached to the common header are signals of bit rate B.

In the data frame shown in FIG. 14, a plurality of ATM cells of bit rate A (ATM cell rate A) is attached to the PCBd, which is equivalent to a frame header. A plurality of ATM cells of bit rate B (ATM cell rate B) follows the ATM cells of bit rate A. When bit rate A is 2.5 Gbps and bit rate B is 10 Gbps, which is four times bit rate A, the ATM cell of bit rate B (ATM cell rate B) can hold four times as much data as the ATM cell of bit rate A (ATM cell rate A).

In the third embodiment, a common header of bit rate A is attached to the ATM cells of bit rate B (ATM cell rate B). Consequently, each ATM cell of bit rate B (ATM cell rate B) can accommodate ATM cells of three destination ONUs 300 and a common header. In other words, the ATM cell of bit rate B (ATM cell rate B) can transfer thrice as much data as the ATM cell of bit rate A (ATM cell rate A) while being of the same length as the ATM cell of bit rate A (ATM cell rate A).

Further, as the ATM cells are of fixed length, known pattern signals for synchronization preserving patterns can be accommodated in the ATM cell of bit rate B (ATM cell rate B) in any portion other than the common header and the ATM cells. The known pattern signals may be stored in any position other than the common header and the ATM cells in the ATM cell of bit rate B (ATM cell rate B). Each ATM cell in the ATM cell of bit rate B (ATM cell rate B) has its own individual header containing therein the individual ID of the destination ONU 300.

Thus, attaching individual headers of bit rate B to data pieces of bit rate B and a common header of bit rate A to a plurality of sets of individual header and data enables the ONUs 300 capable of receiving data of bit rate A to precisely recognize and ignore the data portions of bit rate B, and the ONUs 300 capable of receiving data of bit rate B to retrieve data meant for themselves from the data portions of bit rate B.

Figure 15:
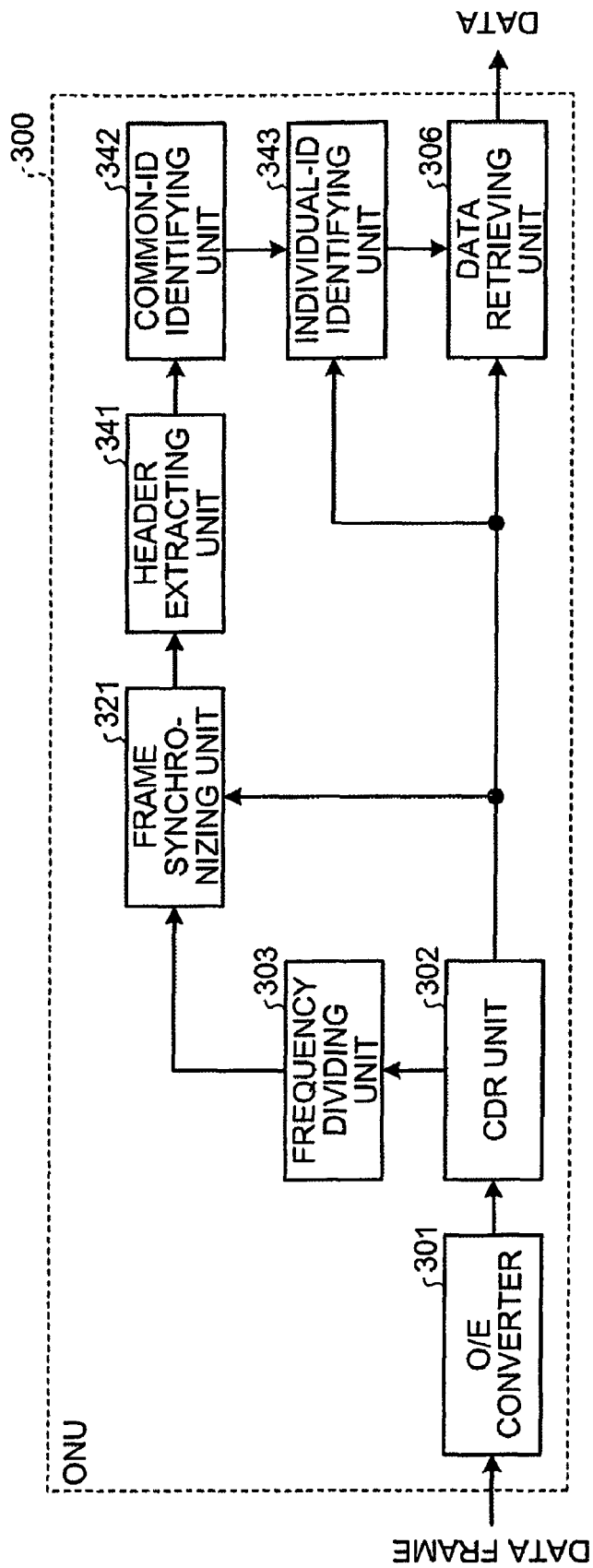
FIG. 15 is a block diagram of an ONU according to the third embodiment.

FIG. 15 is a block diagram of the ONU 300 according to the third embodiment. The parts or components in FIG. 15 that are identical to those in FIGS. 7 and 10 have been assigned the same reference numerals and are not described again. The ONU 300 shown in FIG. 15 includes the O/E converter 301, the CDR unit 302, the frequency dividing unit 303, the frame synchronizing unit 321, a header extracting unit 341, a common-ID identifying unit 342, an individual-ID identifying unit 343, and the data retrieving unit 306. FIG. 15 shows a configuration of the ONU 300 capable of receiving data of bit rate B.

The header extracting unit 341 extracts the headers and the common header of bit rate A from the data frame when frame synchronization is established by the frame synchronizing unit 321. The positions of the headers and the common header can be determined from the information stored in the frame header.

The common-ID identifying unit 342 identifies, from the information stored in the headers and the common header of bit rate A, the common ID indicating that data of bit rate B is attached to the headers and the common header, and instructs the individual-ID identifying unit 343 to retrieve the data portions of the individual header.

In response to the instruction from the common-ID identifying unit 342, the individual-ID identifying unit 343 retrieves the data portions attached to the common header, identifies the individual IDs stored in the individual headers, and detects the data meant for its own ONU 300. The individual-ID identifying unit 343 instructs the data retrieving unit 306 to retrieve the data meant for its own ONU 300.

Thus, in the third embodiment, a common header containing therein a common ID is attached ahead of the data portions of bit rate B. Consequently, the ONUs 300 capable of receiving data of bit rate B can locate the positions of the data portions of bit rate B by detecting the common ID from the data frame. Further, individual headers of bit rate B are contained in the data portions of bit rate B. Consequently, the ONU 300 can identify data meant for itself from the individual header and can retrieve the data.

On the other hand, the ONUs 300 capable of receiving data of bit rate A can locate the positions of the data portions of bit rate B by detecting the common ID from the data frame, and ignore the data portions. Thus, the ONUs 300 capable of receiving data of bit rate A are not adversely affected by the data portions of bit rate B.

Thus, according to the third embodiment, the OLT stores in the data portion of bit rate B data pieces meant for addresses a plurality of ONUs and individual headers as well as attaching a common header of bit rate A that indicates the attached data portions are signals of bit rate B. Consequently, all the ONUs are able to precisely locate the positions of the data portions of bit rate B from the common header, enabling the ONUs capable of receiving data at bit rate A to ignore the data portions and the ONUs capable of receiving data at bit rate B to identify the data meant for themselves from the individual header in the data portion.

In a fourth embodiment of the present invention, the bit rate of the signal is changed so that the high bit rate is an integral multiple of the low bit rate used in the header.

Figure 16:
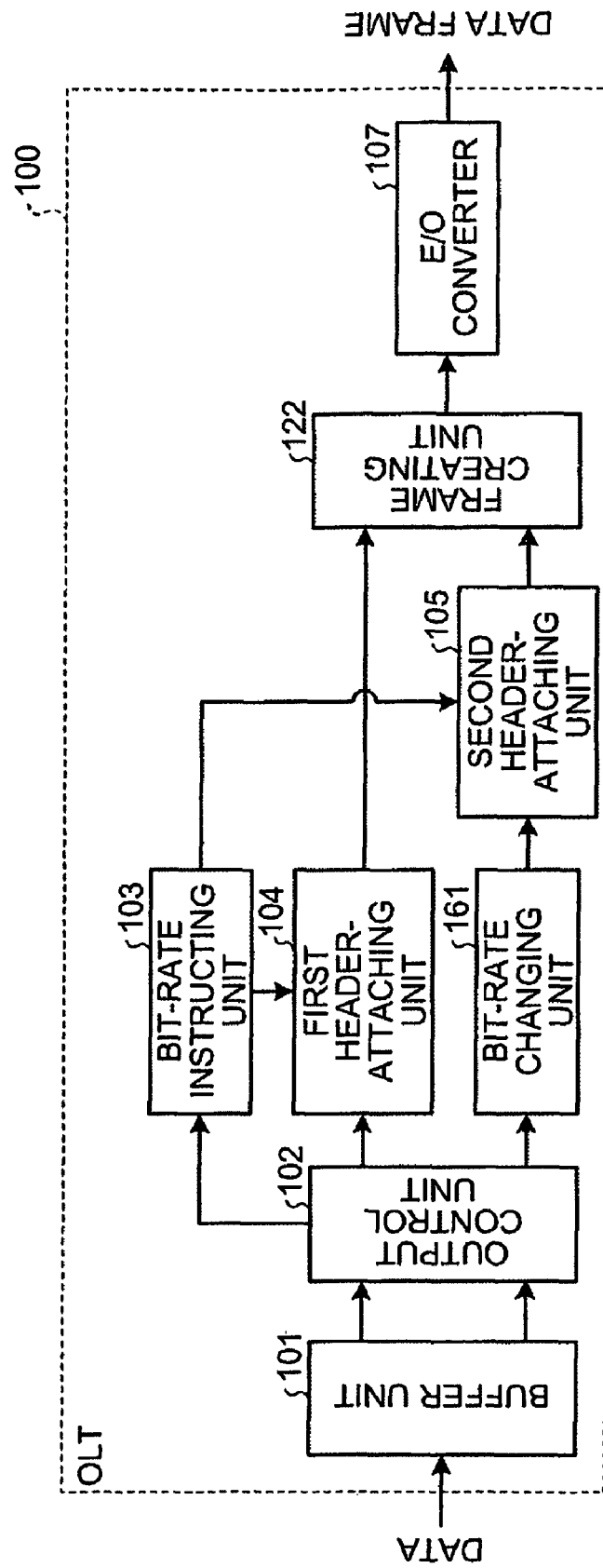
FIG. 16 is a block diagram of an OLT according to a fourth embodiment of the present invention.

FIG. 16 is a block diagram of a relevant part of the OLT 100 according to the fourth embodiment. The parts or components in FIG. 16 that are identical to those in FIGS. 2 and 8 have been assigned the same reference numerals and are not described again. The OLT 100 shown in FIG. 16 is identical to the OLT 100 shown in FIG. 8 except that the synchronization-preserving-pattern inserting unit 121 is replaced by a bit-rate changing unit 161.

The bit-rate changing unit 161 changes the bit rate of the data output from the output control unit 102 to a multiple of bit rate A. In other words, the bit-rate changing unit 161 changes bit rate B of the data output from the output control unit 102 to bit rate C, which is an integral multiple of bit rate A.

In the fourth embodiment, making the high bit rate C an integral multiple of the low bit rate A enables the ONUs 300 capable of receiving data at bit rate C to easily perform the frequency dividing during the header extraction.

Thus, according to the fourth embodiment, changing the high bit rate to an integral multiple of the bit rate of the header enables the wavelength division of the clock signal to be performed easily on the receiving side.

In the above embodiments, there are two (bit rates A and B) or three (bit rate C in addition to bit rates A and B) different bit rates corresponding to the plurality of ONUs 300. However, there can be four or more different bit rates corresponding to the ONUs 300. In such a case, the header in the transmission unit (or the common header) should be of the least bit rate from among those bit rates.

Figure 17:
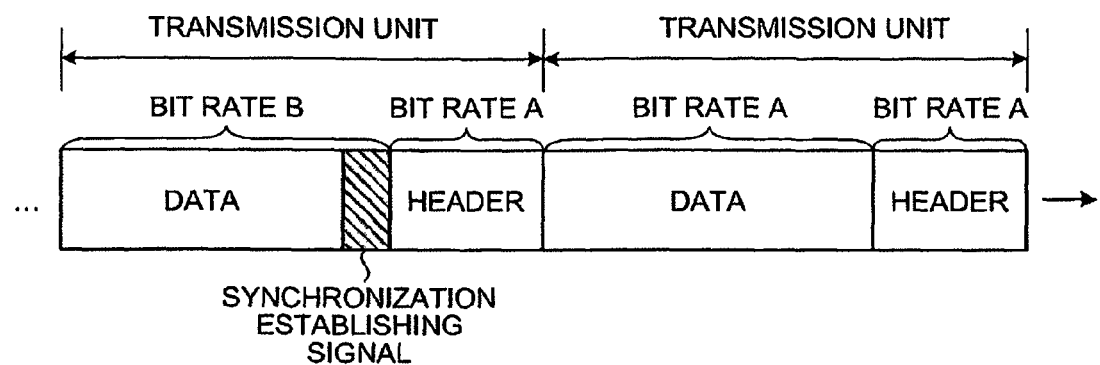
FIG. 17 is a schematic representation of a configuration of a data frame according to another embodiment of the present invention.

In the above embodiments, the configuration of the data frame can be as shown in FIG. 17. In other words, a synchronization establishing signal can be inserted at the beginning of the data portion of bit rate B. This configuration of the data frame enables the ONU 300 of bit rate B to unequivocally establish synchronization using the synchronization establishing signal when retrieving the data portion of bit rate B.

Figure 18:
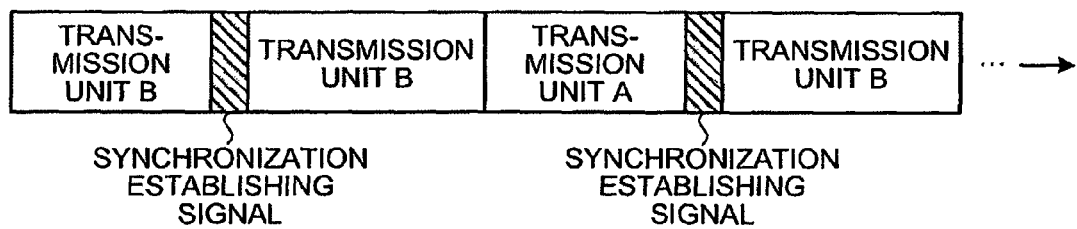
FIG. 18 is a schematic representation of a configuration of a data frame according to yet another embodiment of the present invention.

Further, in the above embodiments, as there are different bit rates in a data frame, the synchronization establishing signals of bit rate A can be inserted at positions where there is a change over of bit rate B to bit rate A, as shown in FIG. 18. In FIG. 18, there is a synchronization establishing signal of bit rate A inserted at the junction between a transmission unit containing data of bit rate B (transmission unit B) and a transmission unit containing data of bit rate A (transmission unit A).

A synchronization establishing signal of bit rate A can also be inserted at the junction between two transmission units containing data of bit rate B (transmission unit B). As the header is a signal of bit rate A irrespective of whether it is a transmission unit A or a transmission unit B, a synchronization establishing signal can be inserted at positions where the bit rate changes from bit rate B to bit rate A. Thus, synchronization can be established more precisely by inserting the synchronization establishing signals at positions where the bit rates change.

According to the embodiments of the present invention, synchronization can be unequivocally established on the receiving side end and degradation of reception quality is prevented. Further, transmission of signals of different bit rates at the same time is enabled.

According to this configuration, in a transmission unit all the headers are of the same bit rate irrespective of the bit rate of the data to which they are attached. Consequently, all the devices on the receiving side can recognize the content of the headers of the transmission unit. As a result, synchronization can be unequivocally established on the receiving side and degradation of reception quality is prevented. Further, transmission of signals of different bit rates at the same time is enabled.

According to this configuration, known bit patterns of least bit rate are inserted in the data portion of a greater bit rate. Consequently, even the devices capable of receiving data of least bit rate can sustain already established synchronization using the data portion of the greater bit rate.

According to this configuration, a common header of least bit rate is attached to a data portion that includes a plurality of sets of data and its individual header of the greater bit rate. As a result, the devices on the receiving side can recognize from the common header the bit rate of the data portion attached to the common header. The devices on the receiving side capable of receiving data at the greater bit rate can recognize data meant for themselves from the individual headers.

According to this configuration, the greater bit rate is an integral multiple of the least bit rate. Consequently, a clock signal of least bit rate can be easily obtained from a clock signal of the greater bit rate during frequency dividing.

According to this configuration, data concerning a length of the data is stored in the header of least bit rate. Consequently, the device on the receiving side can correctly recognize the length of the data from the header even if the transmission unit contains data of different lengths.

According to this configuration, a frame is created from a plurality of transmission units. Consequently, data with a plurality of different bit rates can be included in a frame even while conforming to the specifications set down in Recommendation G. 984.3 of ITU-T.

According to this configuration, a frame header is attached to the beginning of a frame. Consequently, the device on the receiving side can recognize the positions of the plurality of transmission units in the frame.

According to this configuration, synchronization establishing signals are inserted at the junction where bit rate differ. Consequently, the device on the receiving side can unequivocally establish synchronization even if there is a change in the bit rate.

According to this configuration, a slow clock signal of least bit rate is obtained by frequency dividing, and the destination address of the data is identified from the header using the slow clock signal. Consequently, headers of least bit rate are attached to all the data, the device on the receiving side can easily identify the destination addresses of the data from the headers.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission device that transmits data to a plurality of destination addresses, comprising:
    a buffer that stores and outputs data of a first bit rate to fill one transmission device and data of a second bit rate to fill one transmission device, the second bit rate being greater than the first bit rate;
    a first header-attaching device that attaches a header of the first bit rate to the data of the first bit rate output from the buffer to generate a transmission device, the header of the first bit rate including identification data for identifying a destination address of the data of the first bit rate;
    a second header-attaching device that attaches the header of the first bit rate to the data of the second bit rate output from the buffer to generate another transmission device, the header of the first bit rate including identification data for identifying a destination address of the data of the second bit rate;
    an inserting device that inserts known bit patterns of the first bit rate in the data of the second bit rate at predetermined periodicity; and
    a transmitter that includes a frame creating device that creates a frame by performing time division multiplexing on the transmission device generated by the first header-attaching device and the second header-attaching device, and transmits the frame created by the frame creating device.

2. The optical transmission device according to claim 1, wherein the first header-attaching device includes, in the header of the first bit rate, information concerning a length of the data of the first bit rate, and the second header-attaching device includes, in the header of the first bit rate, information concerning a length of the data of the second bit rate.

3. The optical transmission device according to claim 1, wherein the frame creating device creates the frame including, at the beginning thereof a frame header indicating a position of the data of the first bit rate or the second bit rate in the frame.

4. The optical transmission device according to claim 1, further comprising a signal inserting device that inserts a synchronization establishing signal of the first bit rate at a junction where the second bit rate changes to the first bit rate.

5. An optical transmission method for transmitting data to a plurality of destination addresses, comprising:
    obtaining data of a first bit rate to fill one transmission device and data of a second bit rate to fill one transmission device from a buffer, the second bit rate being greater than the first bit rate;
    first attaching a header of the first bit rate to the data of the first bit rate to generate a transmission device, the header of the first bit rate including identification data for identifying a destination address of the data of the first bit rate;
    second attaching the header of the first bit rate to the data of the second bit rate to generate another transmission device, the header of the first bit rate including identification data for identifying a destination address of the data of the second bit rate;
    inserting known bit patterns of the first bit rate in the data of the second bit rate at predetermined periodicity;
    creating a frame by performing time division multiplexing on the transmission device generated at the first attaching and the second attaching; and
    transmitting the frame created.

* * * * *